March 31, 1964 R. D. HAWN 3,126,641

INDICATORS

Filed Sept. 29, 1960

INVENTOR.
ROBERT D. HAWN

BY Arthur H. Swanson

ATTORNEY.

United States Patent Office 3,126,641
Patented Mar. 31, 1964

3,126,641
INDICATORS

Robert D. Hawn, Silver Spring, Md., assignor to Minneapolis-Honeywell Regulator Company, Minneapolis, Minn., a corporation of Delaware Filed Sept. 29, 1960, Ser. No. 59,435
2 Claims. (Cl. 33—172)

This invention relates to visual indicators. More specifically, the present invention relates to footage indicators for reeled material.

An object of the present invention is to provide an improved footage indicator for tape reels.

Another object of the present invention is to provide an improved tape reel footage indicator for providing a simultaneous visual and mechanical representation of the reeled tape footage.

A further object of the present invention is to provide an improved tape reel footage indicator for providing a mechanical and visual safeguard against an improper dismounting of the tape reel.

In accomplishing these and other objects, there has been provided, in accordance with the present invention, a tape reel footage indicator having a first arm fastened at one end thereof to a rotatable shaft. The other end of this arm is arranged to ride on the surface of the reeled material. A second arm is also fastened to the aforesaid shaft in a relatively identical position with the first arm but displaced transversely along the shaft. Consequently, the second arm is arranged in a spatial position alongside the outside surface of a reel flange in a radial displacement with respect to the reel equal to that of the first arm.

A better understanding of the present invention may be had by reading the following detailed description in connection with the accompanying drawings, in which.

Figures 1, 2:
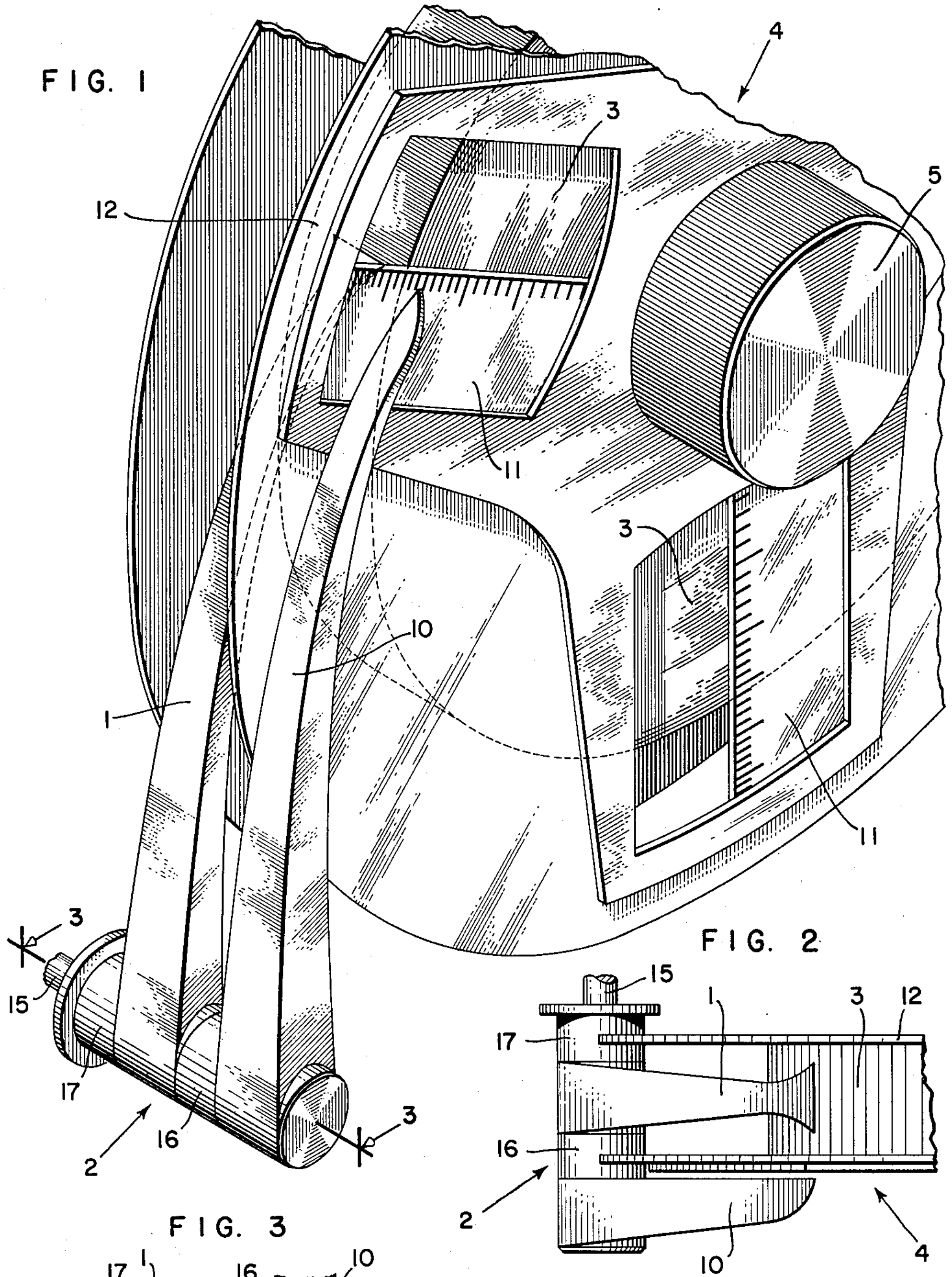
FIG. 1 is a perspective representation of a footage indicator embodying the present invention.
FIG. 2 is a side view of the apparatus shown in FIG. 1.

Referring to FIG. 1 in more detail, there is shown a footage indicator having a first arm 1 attached at one end thereof to a support member 2. The other end of the first arm 1 is arranged to ride on the surface of the reeled material 3 in the reel 4; i.e., the first arm 1 extends from the support member 2 to the surface of the material 3 and passes between the side flanges of the reel 4.

The reel 4 is supported on a reel hub 5 which hub has its axis parallel to the axis of the support member 2.

A second arm 10 is attached at one end thereof to the support member 2 in a position substantially parallel to that of the first arm 1 but displaced transversely therefrom on the support member 2. Thus, the radial displacement of the other end of the second arm 10, with respect to the reel 4, is identical to that of the end of the first arm 1 riding on the reeled material 3. This radial displacement of the remote end of the first arm 1 is occasioned by the removal or addition of the reeled material 3 on the reel 4. Consequently, the radial displacement is a representation of the footage of the reeled material 3 on the reel 4. In order to more clearly indicate this footage, a scale 11 may be arranged on the outside surface of a flange 12 of the reel 4. The radial displacement of the second arm 10 in parallel relation with the first arm 1 is effective to position the free end of the second arm 10 adjacent to a marking on the scale 11 representative of the footage of the reeled material.

Figure 3:
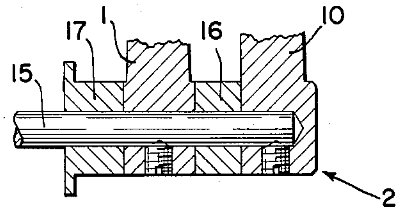
FIG. 3 is a cross-sectional representation of the apparatus shown in FIG. 1 along the lines 2—2.

Referring to FIGS. 2 and 3, there is shown a side view and a cross-sectional representation of the apparatus shown in FIG. 1 along line 2—2, respectively. A common shaft 15 within the support member 2 is attached to the first arm 1 and the second arm 10. A first and a second spacing element 16, 17 are mounted on the shaft 15. The first spacing element 16 is effective to space the first and second arms 1, 10 and the second spacing element 17 is effective to space the first arm 1 from an associated mounting panel (not shown).

Since the shaft 15 is fastened to the first and second arms 1, 10, the rotation of the shaft 15 is also representative of the footage of the reeled material 3. This rotation may be utilized in any suitable device to control the movement of the reel 4 in a desired relation to the quantity of reeled material thereupon, such devices being well-known in the art.

The combination of the second arm 10 with the first arm 1 is further effective to visually indicate the position of the first arm 1 which first arm 1 may be hidden within the reel 4. This visual indication provided by the second arm 10 is effective to safeguard the first arm 1 against possible damage of the hidden first arm 1 by an improper removal of the reel 4 from the hub 5. In the operation of the present invention, the removal of the reel 4 may be effected only after the second arm 10 and, consequently, the first arm 1, is displaced to a spatial position external to the reel 4. Thus, the first arm 1 is thereby removed from within the reel 4 which reel may be subsequently removed from the hub 5 without damaging the first arm 1.

Thus, it may be seen that there has been provided, in accordance with the present invention, a footage indicator for reeled material having a simultaneous visual and mechanical footage representation and providing a safeguard against damage to the indicator by an improper dismounting of a reel.

What is claimed is:

1. A footage indicator for reeled material comprising a reel, a footage scale mounted on an outside face of said reel, a first arm having a first end and a second end, said first end being arranged to contact said reeled material, a first pivot means attached to said second end for pivotally supporting said second end at a point beyond the outer radius of said reel, a second arm having a first end and a second end, said first end being arranged adjacent to an outside face of said reel in an indicating relationship with said scale, a second pivot means for pivotally supporting said second end of said second arm to support said second arm in substantially parallel relationship with said first arm and a shaft means for rotatably supporting said first and said second pivot means in a predetermined fixed relationship with respect to each other.

2. A footage indicator for reeled material comprising a reel, a scale mounted on a outside face of said reel, a first arm having a first end and a second end, said first end being arranged to contact said reeled material, a first pivot means attached to said second end for pivotally supporting said second end at a point beyond the outer radius of said reel, a second arm having a first end and a second end, said first end being arranged adjacent to an outside face of said reel in an indicating relationship with a scale, a second pivot means for pivotally supporting said second end of said second arm to support said second arm in substantially parallel relationship with said first arm, shaft means for rotatably supporting said first and said second pivot means in a predetermined fixed relationship with respect to each other and spacing means for spacing said first pivot means from said second pivot means on said shaft means.

References Cited in the file of this patent

UNITED STATES PATENTS

| | | |
|---|---|---|
| 1,233,868 | Godwin | July 17, 1917 |
| 1,985,228 | Borroughs | Dec. 25, 1934 |
| 2,273,701 | Funke | Feb. 17, 1942 |